United States Patent [19]
Willcox

[11] Patent Number: 5,308,900
[45] Date of Patent: May 3, 1994

[54] POLYETHYLENE COMPOSITIONS

[75] Inventor: Kenneth W. Willcox, Bartlesville, Okla.

[73] Assignee: Phillips Petroleum Company, Bartlesville, Okla.

[21] Appl. No.: 980,401

[22] Filed: Nov. 24, 1992

[51] Int. Cl.$^5$ .............................................. C08K 5/527
[52] U.S. Cl. ..................................... 524/120; 524/399
[58] Field of Search ................................ 524/120, 399

[56] References Cited

U.S. PATENT DOCUMENTS

| | | | |
|---|---|---|---|
| 4,185,004 | 1/1980 | Mathis | 260/45.8 NT |
| 4,230,831 | 10/1980 | Sakurai et al. | 525/240 |
| 4,390,666 | 6/1983 | Moriguchi et al. | 525/194 |
| 4,443,572 | 4/1984 | Burns | 524/120 |
| 4,675,356 | 6/1987 | Miyata | 524/424 |
| 4,778,838 | 10/1988 | Greco et al. | 524/99 |
| 4,793,972 | 12/1988 | Willcox | 422/7 |
| 4,806,580 | 2/1989 | Bock et al. | 524/110 |
| 4,824,883 | 4/1989 | Walters et al. | 524/93 |
| 4,828,892 | 5/1989 | Kersten et al. | 428/35.2 |
| 4,829,110 | 5/1989 | Van Asbroeck et al. | 524/81 |
| 4,885,162 | 12/1989 | Kawai et al. | 424/83 |
| 4,981,760 | 1/1991 | Naito et al. | 428/523 |
| 4,996,248 | 2/1991 | Nelson et al. | 523/136 |
| 5,000,917 | 3/1991 | Willcox | 422/15 |
| 5,019,627 | 5/1991 | Honma et al. | 525/240 |
| 5,063,264 | 11/1991 | Nakajima | 524/118 |
| 5,066,460 | 11/1991 | Willcox | 422/7 |
| 5,070,129 | 12/1991 | Bailey | 524/399 |
| 5,102,611 | 4/1992 | Wolfe et al. | 264/568 |

FOREIGN PATENT DOCUMENTS

| | | |
|---|---|---|
| 62-135550 | 6/1987 | Japan . |
| 62-190242 | 8/1987 | Japan . |
| 63-234064 | 9/1988 | Japan . |

Primary Examiner—Veronica P. Hoke
Attorney, Agent, or Firm—Carl D. Corvin

[57] ABSTRACT

A polyethylene composition that resists changing color when subjected to ultraviolet light said polyethylene composition comprises:
(a) bis(2,4-di-tert-butylphenyl)pentaerythritol diphosphite, in an amount that is at least about 0.001 parts but less than 0.30 parts per 100 parts by weight of said polyethylene; and
(b) zinc stearate, in an amount that is from about 0.1 part 1 part per 100 parts by weight, of said polyethylene.

7 Claims, No Drawings

POLYETHYLENE COMPOSITIONS

BACKGROUND OF THE INVENTION

This invention relates to the field of polyethylene compositions.

Ultraviolet light has a wave length from about 10 to about 400 nanometers. When ultraviolet radiation comes into contact with a polymer, that polymer tends to degrade into a less useful composition.

Recently however, ultraviolet light radiation has been used to cure labels onto plastic articles as well as to cure certain types of printing inks onto plastic articles. The advantages of using ultraviolet light radiation to cure printing ink is that these UV curable printing inks containing very little solvent in them. This promotes fast curing of the printing ink as well as elimination of any fire hazard associated with using a solvent-based liquid ink.

Another advantage of using ultraviolet light radiation is the elimination of the thermal ovens that are usually used in drying solvent based liquid inks. This produces a cost savings as well as an energy savings by not using these thermal ovens. Additionally, due to recent clean air legislation the use of solvent based liquid inks is undesirable since 30 to 60% of a solvent-based liquid ink evaporates into the air.

However, it was recently discovered that while subjecting certain types of polyethylene compositions to high intensity ultraviolet light radiation these compositions discolored. This invention provides a solution to minimize this discoloring phenomenon.

SUMMARY OF THE INVENTION

It is an object of this invention to provide a polyethylene composition that resists discoloration by ultraviolet radiation.

In accordance with this invention a polyethylene composition that resists discoloration when subjected to ultraviolet light is provided. This polyethylene composition comprises:

(a) bis(2,4-di-tert-butylphenyl)pentaerythritol diphosphite, in an amount that is from about 0.001 parts but less than 0.30 parts per 100 parts of said polyethylene; and (b) zinc stearate, in an amount that is from 0.1 parts to 1 part per 100 parts of said polyethylene.

DETAILED DESCRIPTION OF THE INVENTION

The polyethylene used in this invention can be produced by any method known in the art. It can also be a homopolymer or a copolymer composition. For the purposes of this specification the term "polyethylene" will mean both polyethylene homopolymers compositions and polyethylene copolymer compositions. When the polyethylene is a copolymer composition, the comonomer can be any other olefin. For example, such olefins as propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, 1,3-butadiene as well as mixtures of two or more said olefins can be used in this invention. Examples of polymerization processes and catalysts useful in polymerizing ethylene are disclosed in U.S. Pat. Nos. 3,152,872; 3,172,737; 3,203,766; 3,225,023; 3,226,205; 3,242,150; 3,248,179; 3,374,211; 3,622,521; 3,622,522; 3,842,060; 3,887,494; 3,900,457; 3,947,433; 3,998,995; 4,053,436; 4,081,407; 4,119,569; 4,121,029; 4,151,122; 4,177,162; 4,294,724; 4,296,001; 4,345,055; 4,364,839; 4,364,841; 4,364,842; 4,364,854; 4,364,855; 4,392,990; 4,397,765; 4,402,864; 4,405,501; 4,735,931; 4,981,831; and 5,037,911.

Another component in the polyethylene composition is bis(2,4-di-tert-butylphenyl)pentaerythritol diphosphite. This compound is available commercially from the General Electric Corporation under the tradename Ultranox 626. This compound is known as a secondary antioxidant. It is usually used in conjunction with a primary antioxidant. This compound improves the thermal stability and color stability of a polyolefin. However, when this compound is subjected to ultraviolet light radiation it generally turns a yellow-green color. The amount of bis(2,4-di-tert-butylphenyl)pentaerythritol diphosphite to use in the polyethylene composition is generally below 0.30 parts per 100 parts of polyethylene composition. However, preferably the amount of bis(2,4-di-tert-butylphenyl)pentaerythritol diphosphite to use is from about 0.001 to less than 0.30 parts per 100 parts polyethylene. However, it is most preferred that the amount of bis(2,4-di-tert-butylphenyl)pentaerythritol diphosphite used is from about 0.005 to less than 0.30 parts per 100 parts of polyethylene. The structure of this compound is as follows.

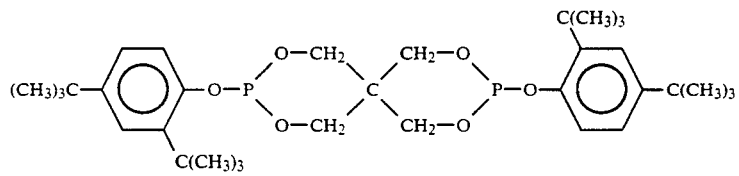

Another component to use in the polyethylene composition is zinc stearate. Zinc stearate is available from a wide variety of commercial sources. The amount of zinc stearate to use is from about 0.1 to about 1 part per 100 parts of polyethylene. Preferably, the amount used is from about 0.2 to about 0.8 parts per 100 parts of polyethylene, and most preferably it is from 0.3 to 0.6 parts per 100 parts of polyethylene. Zinc stearate used in amounts less than about 0.1 parts per 100 parts of polyethylene will not be as effective in minimizing the discoloration of polyethylene composition that contains bis(2,4-di-tert-butylphenyl)pentaerythritol diphosphite after the polyethylene composition is subjected to ultraviolet light radiation. However, amounts greater than 1 part per 100 parts resin will not substantially benefit the polyethylene.

Additionally, the weight ratio of zinc stearate to bis(2,4-di-tert-butylphenol) pentaerythritol can be useful in minimizing the discoloration of these polyethylene compositions. In this case, it is preferred that the weight ratio be from about 5 to about 50; however, it is more preferred that the weight ratio be about 10 to about 40; and it is most preferred that the weight ratio be from 15 to 30.

These components can be blended in any manner known in the art. For example, they can be dry blended in a bag, in a mixer, or in any other suitable container. It is preferable that after blending the polyethylene composition is extruded to thoroughly mix the components. After mixing, the polyethylene composition can be subjected to ultraviolet light having a wave length between about 10 to about 400 nanometers. However, the more intense the radiation is, the greater the benefits of using the preferred combination of zinc stearate and bis(2,4-di-tert-butylphenyl)pentaerythritol diphosphite.

EXAMPLES

These examples are provided to assist a person skilled in the art with further understanding this invention. These examples are intended to be illustrative of the invention but are not meant to be construed as limiting the reasonable scope of the invention.

EXAMPLE ONE

To 100 parts of polyethylene fluff, 0.30 parts of Irganox 1076 was added. Irganox 1076 is octadecyl 3-(3',5'-di-tert-butyl-4'-hydroxyphenyl) propionate. It is a primary antioxidant available from the Ciba-Geigy Corporation. Also the indicated amount of bis(2,4-di-tert-butylphenyl)pentaerythritol diphosphite was added to the polyethylene fluff. Additionally, the indicated amount of zinc stearate was added to the polyethylene fluff.

These components were then dry blended together for about two minutes. Thereafter, this fluff was extruded in a twin screw extruder that had four separate temperature zones. Zone 1 was at 190° C., Zone 2 was at 210° C., Zone 3 was at 220° C., and Zone 4 was at 215° C. The extruder screws rotated at 25 rpm. After extruding the polyethylene composition it was strand pelletized and placed in sample cartons.

Each sample carton was then analyzed by a Hunter Lab D25 Optical Sensor purchased from Hunter Associate Laboratory, Inc. This analysis provided the initial Hunter "a" and Hunter "b" values (AI and BI in Table E1).

A negative Hunter "a" value indicates that the sample tends to be green. The more negative the value, the more intense the green color is in the sample. A positive Hunter "a" value indicates that the sample tends to be red. The more positive the value, the more intense the red color is in the sample. Likewise, a negative Hunter "b" value indicates that the sample tends to be blue. The more negative the value, the more intense the blue color is in the sample. A positive Hunter "b" value indicates that the sample tends to be yellow. The more positive the value, the more intense the yellow color is in the sample. Consequently, each sample can have 2 Hunter values, a green-red value and a blue-yellow value.

After each sample was analyzed for its initial Hunter "a" and Hunter "b" values, it was subjected to ultraviolet radiation. This ultraviolet radiation was delivered by UVS-54 6 watt short-wave length (254 nm) 115 volts hand-held mineral light purchased from Fluorescent Minerals Company. This mineral light produced a broad band of ultraviolet radiation with a maximum intensity at 254 nanometers. This mineral light delivered 140 microwatts of energy per square-centimeter at a wave-length of 310 nm. Each sample was subjected to this radiation for two minutes. Thereafter, each sample was analyzed again by the Hunter Lab D25 Optical Sensor for the Hunter "a" and Hunter "b" values. This analysis provided the final Hunter "a" and Hunter "b" values (AF and BF in Table E1).

The results of this experimentation are presented in Table E1.

TABLE E1

| Run | $UX^1$ | $ZS^2$ | $AI^3$ | $BI^4$ | $CI^5$ | $AF^6$ | $BF^7$ | $CF^8$ | $CC^9$ |
|---|---|---|---|---|---|---|---|---|---|
| 1 | 0.02 | 0.00 | −1.72 | −0.19 | 1.73 | −9.94 | 12.03 | 15.05 | 14.25 |
| 2 | 0.02 | 0.35 | −1.79 | −0.09 | 1.79 | −6.01 | 6.53 | 8.88 | 7.85 |
| 3 | 0.015 | 0.00 | −1.61 | −0.01 | 1.61 | −6.70 | 7.94 | 10.39 | 9.44 |
| 4 | 0.015 | 0.35 | −1.81 | −0.02 | 1.81 | −4.47 | 4.27 | 6.18 | 5.01 |
| 5 | 0.01 | 0.00 | −1.79 | 0.19 | 1.80 | −4.90 | 4.89 | 6.92 | 5.64 |
| 6 | 0.01 | 0.35 | −1.75 | −0.08 | 1.75 | −3.87 | 3.34 | 5.11 | 4.02 |
| 7 | 0.0075 | 0.00 | −1.76 | 0.32 | 1.79 | −3.70 | 3.17 | 4.87 | 3.45 |
| 8 | 0.0075 | 0.35 | −1.66 | −0.08 | 1.66 | −3.19 | 2.25 | 3.90 | 2.79 |

[1] This is the amount, in parts per 100 parts polymer, of bis(2,4-di-tert-butylphenyl)pentaerythritol diphosphite used.
[2] This is the amount, in parts per 100 parts polymer, of zinc stearate used.
[3] This is the initial Hunter "a" value.
[4] This is the initial Hunter "b" value.
[5] This is the relative initial color value. It is defined for the purposes of this specification as $[(AI)^2 + (BI)^2]^{\frac{1}{2}}$.
[6] This is the final Hunter "a" value.
[7] This is the final Hunter "b" value.
[8] This is the relative final color value. It is defined for the purposes of this specification as $[(AF)^2 + (BF)^2]^{\frac{1}{2}}$.
[9] This is the relative change in the initial and final color value. It is defined for the purposes of this specification as $[(AF - AI)^2 + (BF - BI)^2]^{\frac{1}{2}}$.

As can be seen from Table E1, Run 1, bis(2,4-di-tert-butylphenyl)pentaerythritol diphosphite will give off a very yellow-green color. However, In Run 2 the addition of 0.35 parts of zinc stearate minimizes the discoloring effect of bis(2,4-di-tert-butylphenyl)pentaerythritol diphosphite. Comparing Runs 3–8 it is apparent that this trend continues although with less effect through the rest of the indicated proportion ranges.

EXAMPLE TWO

Another set of samples were produced and analyzed in accordance with the procedure disclosed in Example One. The results of this experimentation are presented in Table E2.

TABLE E2

| Run | $UX^1$ | $ZS^1$ | $AI^3$ | $BI^4$ | $CI^5$ | $AF^6$ | $BF^7$ | $CF^8$ | $CC^9$ |
|---|---|---|---|---|---|---|---|---|---|
| $1^{10}$ | 0.00 | 0.00 | −1.63 | 0.58 | 1.73 | −1.66 | 0.67 | 1.79 | 0.10 |

TABLE E2-continued

| Run | UX[1] | ZS[1] | Al[3] | BI[4] | CI[5] | AF[6] | BF[7] | CF[8] | CC[9] |
|---|---|---|---|---|---|---|---|---|---|
| 2 | 0.02 | 0.00 | −1.73 | 0.95 | 1.97 | −8.92 | 12.76 | 15.51 | 13.82 |
| 3 | 0.02 | 0.10 | −1.70 | 0.34 | 1.75 | −7.00 | 8.78 | 11.22 | 9.97 |
| 4 | 0.02 | 0.20 | −1.72 | 0.30 | 1.75 | −5.73 | 6.56 | 8.71 | 7.43 |
| 5 | 0.02 | 0.40 | −1.78 | 1.08 | 2.08 | −4.81 | 5.66 | 7.42 | 5.49 |
| 6 | 0.02 | 0.60 | −1.83 | 1.68 | 2.48 | −4.43 | 5.66 | 7.19 | 4.75 |
| 7 | 0.02 | 0.80 | −1.88 | 1.93 | 2.69 | −4.28 | 5.70 | 7.12 | 4.47 |
| 8 | 0.02 | 1.00 | −1.84 | 2.06 | 2.76 | −4.00 | 5.47 | 6.78 | 4.04 |
| 9 | 0.00 | 0.35 | 1.80 | 0.92 | 2.02 | −2.37 | 1.88 | 3.03 | 1.12 |
| 10 | 0.02 | 0.35 | 1.47 | −0.61 | 1.59 | −5.61 | 5.27 | 7.69 | 7.19 |

For Notes 1-9, See Table E1.
[10]This run did not contain any Irganox 1076.

It is apparent from Runs 3-8 that as the amount of zinc stearate increased from 0.1 to 1, the discoloration effect decreased. However, these runs also show that increasing the amount of zinc stearate brought less and less beneficial results in the discoloration. Thus, indicating the diminishing return aspect of adding additional zinc stearate.

That which is claimed is:

1. A polyethylene composition comprising:
   (a) bis(2,4-di-tert-butylphenyl)pentaerythritol diphosphite, in an amount that is at least about 0.001 parts but less than 0.3 parts per 100 parts by weight of said polyethylene; and
   (b) zinc stearate, in an amount that is from about 0.01 parts to 1 part per 100 parts by weight of said polyethylene.

2. A polyethylene composition according to claim 1 wherein the amount of bis(2,4-di-tert-butylphenyl)pentaerythritol diphosphite is from about 0.005 parts to less than 0.3 parts per 100 parts of polyethylene.

3. A polyethylene composition according to claim 1 wherein the amount of zinc stearate is from about 0.2 parts to about 0.8 parts per 100 parts of polyethylene.

4. A polyethylene composition according to claim 1 wherein the amount of zinc stearate is from 0.3 parts to 0.6 parts per 100 parts of polyethylene.

5. A polyethylene composition according to claim 1 wherein the amount of bis(2,4-di-tert-butylphenyl)pentaerythritol diphosphite is from about 0.005 parts to less than 0.3 parts per 100 parts of polyethylene, and the amount of zinc stearate is from 0.2 parts to 0.8 parts per 100 parts of polyethylene.

6. A polyethylene composition according to claim 1 wherein the amount of bis(2,4-di-tert-butylphenyl)pentaerythritol diphosphite is from about 0.01 parts to less than 0.3 parts per 100 parts of polyethylene, and the amount of zinc stearate is from 0.3 parts to 0.6 parts per 100 parts of polyethylene.

7. A polyethylene composition according to claim 1 wherein the weight ratio of zinc stearate to bis(2,4-di-tert-butylphenyl)pentaerythritol diphosphite is from about 5 to about 50.

* * * * *